(12) United States Patent
Chen et al.

(10) Patent No.: US 10,049,297 B1
(45) Date of Patent: Aug. 14, 2018

(54) DATA DRIVEN METHOD FOR TRANSFERRING INDOOR SCENE LAYOUT AND COLOR STYLE

(71) Applicant: BEIHANG UNIVERSITY, Beijing (CN)

(72) Inventors: Xiaowu Chen, Beijing (CN); Jianwei Li, Beijing (CN); Qing Li, Beijing (CN); Dongqing Zou, Beijing (CN); Bo Gao, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/464,209

(22) Filed: Mar. 20, 2017

(51) Int. Cl.
| | |
|---|---|
| *G06K 9/00* | (2006.01) |
| *G06K 9/62* | (2006.01) |
| *G06K 9/46* | (2006.01) |
| *G06T 7/90* | (2017.01) |
| *G06T 7/11* | (2017.01) |
| *G06K 9/66* | (2006.01) |
| *G06T 17/00* | (2006.01) |

(52) U.S. Cl.
CPC ......... *G06K 9/6206* (2013.01); *G06K 9/4652* (2013.01); *G06K 9/6215* (2013.01); *G06K 9/66* (2013.01); *G06T 7/11* (2017.01); *G06T 7/90* (2017.01); *G06T 17/005* (2013.01)

(58) Field of Classification Search
None
See application file for complete search history.

(56) References Cited

U.S. PATENT DOCUMENTS

| | | | | |
|---|---|---|---|---|
| 5,373,987 A | * | 12/1994 | Corabatir | ................. F24F 11/75 236/49.3 |
| 9,595,134 B2 | * | 3/2017 | Ramalingam | ........... G06T 17/00 |
| 2010/0111396 A1 | * | 5/2010 | Boucheron | .......... G06K 9/0014 382/133 |

(Continued)

OTHER PUBLICATIONS

English machine translation of CN104050722.*

(Continued)

*Primary Examiner* — Hadi Akhavannik
(74) *Attorney, Agent, or Firm* — J.C. Patents (57) ABSTRACT

The invention provides a data driven method for transferring indoor scene layout and color style, including: preprocessing images in an indoor image data set, which includes manually labeling semantic information and layout information; obtaining indoor layout and color rules on the data set by learning algorithms; performing object-level semantic segmentation on input indoor reference image, or performing object-level and component-level segmentations using color segmentation methods, to extract layout constraints and color constraints of reference images, associating the reference images with indoor 3D scene via the semantic information; constructing a graph model for indoor reference image scene and indoor 3D scene to express indoor scene layout and color; performing similarity measurement on the indoor scene and searching for similar images in the data set to obtain an image sequence with gradient layouts from reference images to input 3D scene; performing image-sequence-guided layout and color transfer generation for indoor 3D scene.

5 Claims, 3 Drawing Sheets

(56) References Cited

U.S. PATENT DOCUMENTS

| | | | | |
|---|---|---|---|---|
| 2011/0025689 | A1* | 2/2011 | Perez | A63F 13/213 |
| | | | | 345/420 |
| 2012/0041722 | A1* | 2/2012 | Quan | G06T 17/05 |
| | | | | 703/1 |
| 2012/0327172 | A1* | 12/2012 | El-Saban | G06K 9/00228 |
| | | | | 348/14.02 |
| 2013/0084007 | A1* | 4/2013 | Salamati | G06T 7/0087 |
| | | | | 382/173 |
| 2014/0037198 | A1* | 2/2014 | Larlus-Larrondo | G06K 9/00 |
| | | | | 382/159 |
| 2017/0148222 | A1* | 5/2017 | Holzer | H04N 13/0282 |

OTHER PUBLICATIONS

Vouzounaras, Georgios & Daras, Petros & G. Strintzis, Michael. (2011). Automatic generation of 3D outdoor and indoor building scenes from a single image. Multimedia Tools and Applications—MTA. 70. 10.1007/s11042-011-0823-0.*

Schwing, Alexander G., et al. "Efficient structured prediction for 3d indoor scene understanding." Computer Vision and Pattern Recognition (CVPR), 2012 IEEE Conference on. IEEE, 2012. APA.*

Floros, Georgios, and Bastian Leibe. "Joint 2d-3d temporally consistent semantic segmentation of street scenes." Computer Vision and Pattern Recognition (CVPR), 2012 IEEE Conference on. IEEE, 2012.*

* cited by examiner

DATA DRIVEN METHOD FOR TRANSFERRING INDOOR SCENE LAYOUT AND COLOR STYLE

TECHNICAL FIELD

The present invention relates to the field of computer graphics and computer vision and, more particularly, to a data driven method for transferring an indoor scene layout and color style.

BACKGROUND

Three-dimensional (3D) scene modeling and generation have always been an important issue in the field of computer graphics, which have a wide range of application backgrounds, such as animation generation, film production, interior design and military simulation, etc. The application of 3D scene modeling and deformation technology to the field of interior design brings forth tremendous economic and social benefits to the current society and creates more speedy and convenient information along with more colorful spiritual enjoyment for people's lives. For example, people in the purchase of household goods hope to decorate to meet their own preferences for the interior style effect. It is somewhat difficult obviously for those who do not major in interior design to describe a specific interior style. But people may choose their favorite interior style in the network full of massive image data and generate a 3D scene of such style with the help of 3D scene modeling and deformation technology. The image-based 3D scene style modeling can not only meet the needs from the people more quickly, but also satisfy the various suggestions on revision put forward by the people more conveniently. The image-based 3D scene modeling is a basic and important issue in the fields of computer vision and computer graphics. At present, many scholars are committed to this field of research, for example, Xiao et al. from Hong Kong University of Science and Technology proposed modeling of street architecture in 2009, Xu et al. from National University of Defense Science and Technology proposed symmetric object modeling in 2011, and Nan et al. from Shenzhen Advanced Technology Research Institute of Chinese Academy of Sciences proposed indoor scene modeling in 2012. While image-based 3D scene modeling has made considerable progress, the present invention relates to the deformation of an indoor scene style which is modeling for style rather than modeling for scene, therefore conventional image-based 3D scene modeling cannot solve the problems relevant to the present invention.

In order to carry out the deformation of the indoor scene style, what firstly needs to be clarified in the present invention is the definition of indoor scene style. In the computer field, at present, yet no scholars have described or quantified the indoor scene style. According to a specialized advice from interior design professionals, the indoor scene style mainly includes two components, namely, the furniture layout in the scene and the color assortment for the scene. Thus the invention conducts the research on the indoor scene style from these two aspects. Yu et al. from UCLA proposed an algorithm for automatically placing furniture in a 3D scene in 2011, Merrell et al. from Stanford University proposed an interactive furniture placement system under guidance of interior design rules in 2011, and Fisher et al. from Stanford University proposed a sample-based object placement generation system in 2012. These layouts require a 3D indoor scene database used as a training set, and the construction of such database is both time-consuming and labor-intensive. In color learning, O' Donovan et al. from the University of Toronto proposed a color compatibility theory in 2011, giving an analysis of various parameters of the color in detail; Chen et al. from Beihang University proposed an edit propagation method based on structural feature preservation in 2012, which can perform color conversion on a target image according to a reference image so that the target image has a color feature consistent with the reference image. Although these work relates to the color conversion, but does not relate to the relation between color and the indoor scene style.

The above research status shows that at present none of the researches of indoor layout and color relates to the scene style, and the researches for the two aspects are not unified into a framework, but simply performed in respective aspects, meanwhile the construction for 3D database is not an easy task. Thereby, the present invention uses the massive image data on the network as a training set to learn the layout rules and color rules for indoor styles, and utilizes these rules to deform a given indoor 3D scene style so that the deformed 3D scene has a scene style similar to an input image.

SUMMARY

According to the above requirements, in order to overcome the shortcomings of the prior art, the purpose of the present invention is to: learn layout rules and color rules of an indoor scene by using an image data set, and establish a sequence of images gradually varying from a 3D scene to a reference image by a graph-model-based algorithm for indoor scene layout similarity measurement. Taking each image in the sequence as a reference image, transform the given indoor 3D scene style into a scene style of the reference image, thereby obtaining a 3D scene sequence with gradient styles. In order to accomplish the purpose of the invention, the technical solution adopted by the invention is that: a data driven method for transferring an indoor scene layout and color style, where the method includes:

step 1, preprocessing an images in an indoor image data set, which includes: manually labeling semantic information to obtain a semantic marking map for each image, and manually labeling layout information to obtain a top view of a layout map for each image;

step 2, obtaining an indoor layout rule and a color rule on the indoor image data set by a learning algorithm;

step 3, performing an object-level semantic segmentation on an input indoor reference image, or performing an object-level segmentation and a component-level segmentation using a color segmentation method, to extract a layout constraint and a color constraint of the reference image, and associating the reference image with an indoor 3D scene via the semantic information;

step 4, constructing a graph model for an indoor reference image scene and the indoor 3D scene, and using the graph model to express a layout and color of an indoor scene;

step 5, performing, according to the graph model, similarity measurement on the indoor scene, and searching for a similar image in the data set to obtain an image sequence with a gradient layout from the reference image to the input 3D scene; and step 6, performing, according to the layout rule and the color rule and combined with the layout constraint and the color constraint for each image in the gradient sequence, image-sequence-guided layout and color transfer generation for the indoor 3D scene to obtain an indoor 3D scene sequence with a layout and color style similar to that in the gradient image sequence.

Where, the "color segmentation method" in step 3 refers to that if different components of an object in an image have different color, the component-level segmentation can be performed on the image by differentiating the different components using a color classification method.

Where, the "graph model" in step 4 is a tree structure graph which represents the indoor scene as a multi-layer structure containing nodes from three layers. Where an entire scene is a global root node; an indoor area is divided into five regions which are region front, region back, region left, region right, region center, all serving as regional sub-nodes; an object contained in each region is an object leaf node of said region. The graph model can represent indoor scene layout distribution and an object pairing relation.

Where, the "performing similarity measurement on the indoor scene" in step 5 refers to that: comparing graph models of two indoor scenes, calculating similarity between different regions of the indoor scenes by calculating node similarity and side similarity of the graph models, and finally calculating overall similarity between the two indoor scenes.

Where, the "image-sequence-guided layout and color transfer generation" in step 6 is a method for gradient style transfer which can be described specifically as: a style of image i in the image sequence being $S_i$, a 3D scene after performing the style transfer according to image i being $M_i$; after completing the style transfer of an ith image, calculating a style difference between an (i+1)th image and the ith image, transferring the style difference to the 3D scene $M_i$ to generate a new 3D scene $M_{i+1}$, the formula is as follows:

$$M_{i+1}=M_i(S_{i+1}-S_i);$$

after such iteration, image-sequence-guided indoor 3D scene transfer generation is completed.

Compared with the prior art, the present invention has the following advantages:

1. The invention utilizes the input image style feature as a constraint and performs the style transfer on the indoor 3D scene combined with the rules learned from the indoor image data set, so as to provide the user with a visualized 3D representation of different indoor styles.

2. The invention utilizes the color segmentation method to extend the image segmentation from object level to component level, so that the result of style transfer is more detailed and real.

3. The invention utilizes the similarity measurement to generate a series of results of 3D scene style transfer and provide the user with more choices.

DESCRIPTION OF EMBODIMENTS

The invention will be described in detail with reference to the appended drawings.

A data driven method for transferring an indoor scene layout and color style, wherein the method includes:

step 1, preprocessing images in an indoor image data set, which includes: manually labeling semantic information to obtain a semantic marking map for each image, and manually labeling layout information to obtain a top view of a layout map for each image;

step 2, obtaining an indoor layout rule and a color rule on the indoor image data set by a learning algorithm;

step 3, performing an object-level semantic segmentation on an input indoor reference image, or performing an object-level and a component-level segmentation using a color segmentation method, to extract a layout constraint and a color constraint of the reference image, and associating the reference image with an indoor 3D scene via the semantic information;

step 4, constructing a graph model for an indoor reference image scene and the indoor 3D scene, and using the graph model to express a layout and color of an indoor scene, where the indoor scene includes the indoor reference image scene and the indoor 3D scene;

step 5, performing, according to the graph model, similarity measurement on the indoor scene, and searching for a similar image in the data set to obtain an image sequence with a gradient layout from the reference image to the input 3D scene;

step 6, performing, according to the layout rule and the color rule and combined with the layout constraint and the color constraint for each image in the gradient sequence, image-sequence-guided layout and color transfer generation for the indoor 3D scene to obtain an indoor 3D scene sequence with a layout and color style similar to that in the gradient image sequence.

Figure 1:
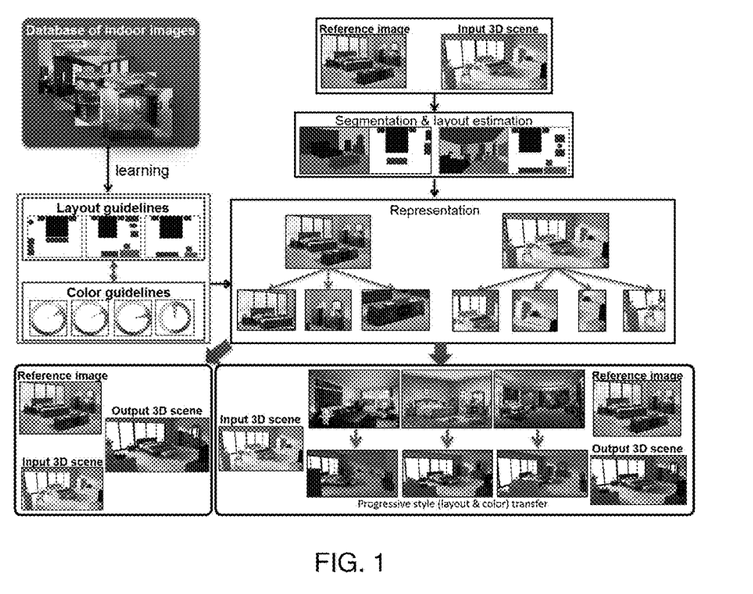
FIG. 1 is an overall flowchart.

The present invention provides a data driven method for transferring an indoor scene layout and color style, and the overall process thereof is shown as FIG. 1. In the method, indoor scene style rules are learned according to the image data set. According to the scene similarity measurement based on the graph model, a plurality of images are selected from the data set, and a gradient sequence of images from the input 3D scene to a single reference image scene is thus formed. Taking each image in the image sequence as a reference image, transfer, from two aspects of layout and color, the layout and color style of the reference image to the indoor 3D scene, so that the indoor 3D scene has a style similar to the reference image, and a 3D scene style transfer sequence with gradient scenes is obtained.

According to the overall process, the present invention firstly performs semantic marking processing on an input image and establishes the semantically corresponding relation with objects in the 3D scene. Firstly, a conventional algorithm for image semantic segmentation is utilized to process the reference image and generate a semantic marking map and a top view of a layout map. The conventional method can only perform the segmentation at the object level. However different parts of some objects are of different color. Taking beds as an example, the headboards and bodies of many beds are of different color. So the color is classified in a color space, thereby achieving the image local segmentation. The specific method is: firstly collecting color of all the pixels of the object and using a K-means method to classify the color, where K is set to be the number of the components in the object. The average value of the color of each class is the dominant hue of the component.

Figure 2:
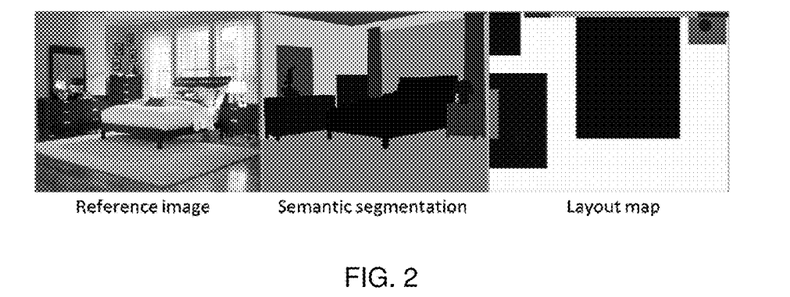
FIG. 2 is a semantic marking map and a top view of a layout for an image.

In the training data set, each training image in the present invention is manually marked with two reference maps, namely a semantic marking map and a top view of a layout map, as shown in FIG. 2. The semantic marking map can not only be used to extract a shape template of a semantic category, but also assist in, due to the fact that the semantic marking map is a side view, learning a layout rule and reflect the relative relation between the objects on top and bottom in the indoor layout. The top view can show the positional relation of front, back, left and right positions among the objects, which is the most important basis for learning the layout rule in the present invention. When manually demarcating the top view, in order to facilitate layout rule learning, the size of the top view will be demarcated to be 800*600 pixels by default, and positions of objects in the scene are demarcated at this resolution level according to professionals' knowledge. In the semantic marking map and the top view of layout marking map, the same semantic categories are visualized with the same color, thereby establishing the semantically corresponding relation between the two reference maps.

The top view of layout marking map is utilized to learn the rule for indoor scene layout distribution. According to the knowledge of the professionals in interior design, the present invention defines four layout rules, where the first one is the position rule for indoor object. The placement of indoor objects is not arbitrary, and their positions have a certain relation; for example, a bed is generally placed in the middle of the indoor area, and a cabinet is generally placed at the side of the indoor area. Therefore, the present invention counts the positional distribution of objects in different categories on the top view of layout marking map, and makes the result as a positional priori value. The top view of layout marking map is divided into block regions with the size of 24*32, and a frequency at which the central point position of the semantic object in each category is distributed in each block region is learned. A positional priori value of the object in each category is calculated according to the following formula, where k is the number of blocks in the top view of layout marking map and f(patch$_i$) is the frequency of the central point position of the object in this category in each block i. ε is a frequency threshold value; in actual operation, only the frequency greater than the threshold value is taken into account, otherwise it is considered to be zero.

$$T_{mean} = \frac{1}{k}\sum_{1}^{k} f(\text{patch}_i), f(\text{patch}_i) > \varepsilon$$

The second rule in layout distribution rules is a pairing rule between objects. Some furniture in the indoor scene has a pairing relation and the distance between them meets certain constraint condition. For example, a bedside table is often placed next to a bed, and a chair is usually placed next to a table. Therefore, this semantic association can play a supporting role in the layout. Without loss of generality, the present invention counts the regularities of position distribution among 7 kinds of semantic category pairs which represent the main semantic association for indoor scenes, namely, bed and bedside table, bedside table and bedside lamp, TV and TV cabinet, bed and TV, sofa and TV, table and chair, tea table and sofa, etc.

The third rule in layout distribution rules is an orientation rule of an indoor object, namely to count the regularities of orientation distribution of a single object. Most of the objects in an indoor scene cling to the wall while leaning against the wall, either at the same orientation as the wall or at an angle of 90°. Thus, the present invention transforms the orientation attribute of the object into the orientation attribute of its closest wall. For those category objects that are often against the wall, such as beds or bedside tables, keep a record of their nearest wall. For objects with paring relation, the orientations thereof tend to be opposite. For example, a chair always faces a table paired with it.

The fourth rule in layout distribution rules is a distance rule, or referred to as an accessible rule. Certain space should be reserved among the furniture to ensure that users can approach each piece of furniture. This distance constraint can not only reflect the function of furniture, but also contain the specialized knowledge of interior design. Therefore the distance is taken as an important rule. The present invention attaches a space of a normal human body width around the object as a distance space. The distance between any two objects should be greater than half of the diagonal length of their bounding boxes. The distance from the center of the bounding box of the object i to the corner is denoted as a diagonal line $d_i$, the distance rule constraint is $\|O_iO_j\| \geq \|d_i + d_j\|$.

In the aspect of color style, the invention firstly requests the interior design professionals to divide the training image data set into subsets of four color styles, including a primary style, an analogous style, a contrasting style and a black-while-grey (B-W-G) style. From four parameters of hue, saturation, brightness and color temperature, the counting and learning of rules in each category are performed. Because there is no obvious regularity in the attributes of saturation and color temperature, the invention mainly focuses on the two parameters of hue and brightness to perform the counting and learning.

Figure 3:
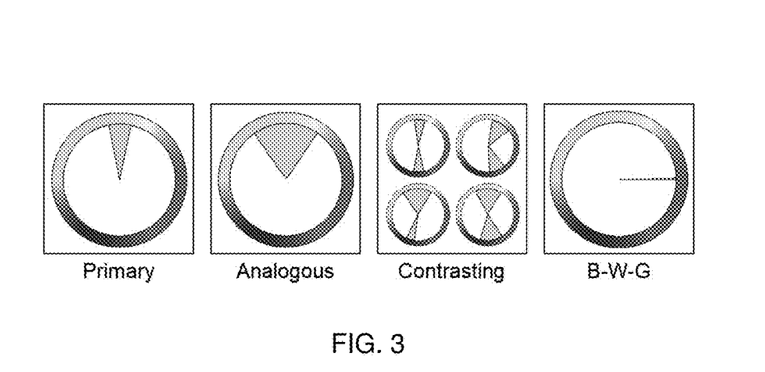
FIG. 3 is a schematic diagram of hue distribution of four color styles.

The present invention learns hue templates of four color styles in an HSV color space, where each of the hue templates must meet the constraint condition that the hue distribution of each training image accounts for at least 80% of a sector region of the hue template so that can the hue template be considered to have the representativeness of the color style in such category. As shown in FIG. 3, the color of H channel of a primary style training image is distributed in a compact tiny sectional region with the type of "i" on a hue circle; the distribution of the analogous style, in comparison with the one of the primary style, is presented in a sectional region with a larger angle, which is denoted as the shape of "V"; in the contrasting style, the color distribution of the H channel presents two regions with angles thereof facing each other and angles between the two regions are of various types which are classified in the present invention as types of "I", "Y", "L" and "X". In the B-W-G style, the hue distribution is very close to the center of the hue circle. The present invention extracts the angle of the hue circle's sector region as a hue template for each color style, and counts the angle values of each template from the training set. The angle of the sectional region with the type of "i" accounts for 5.4% of the total hue circle, i.e., 19.5°; the angle of the sectional region with the type of "V" accounts for 12% of the total hue circle, i.e., 43.16°; the angle of the sectional region with the type of "X" accounts for 14% of the total hue circle, i.e., 50.48°, and the angle between its two regions is 157.35°; in the sectional region with the type of "Y", the larger sector accounts for 14%, which is 51.79°, while the smaller sector accounts for 6.7%, which is 24.09°, and the angle between the two sectional regions is 158.46°; "I" accounts for 6%, which is 21.82°, and the angle between the two sectional regions is 165.46°; "L" accounts for 13.7%, which is 49.14°, and the angle between the two sectional regions is 93.6°.

According to the knowledge of the professionals in interior design, the brightness distribution in the indoor scene presents a regional stepped change, e.g., brightness being increased or decreased progressively from ceiling to wall and then to floor. Therefore, based on the semantic marking map, the present invention counts the brightness distribution of four regions of the training set image, namely the ceiling region, the wall region, the furniture region and the floor region. Since the brightness distribution of the four color styles is substantially the same, the brightness is counted only according to the regions. According to statistics counted, the invention finds out the rule of brightness distribution that the ceiling's brightness is highest, the floor brightness is lowest, and the wall brightness is higher than the brightness of the furniture, i.e., $I_{ceiling} > I_{wall} > I_{furniture} > I_{floor}$. For each region, the invention counts the brightness mean value of each region in the LAB color space, thus obtaining $I_{ceiling}:I_{wall}:I_{furniture}:I_{floor} = 61:53:41:30$.

Figure 4:
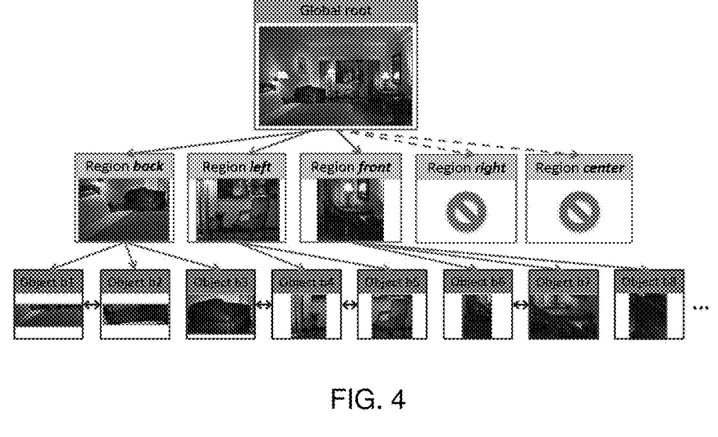
FIG. 4 is schematic diagram of a graph model.

In order to measure the scene similarity, the present invention proposes a graph-model-based algorithm for indoor scene similarity measurement. This graph-model-based representation can describe both an image scene and a 3D scene. This representation can not only express the positional relation among objects, but also accurately describe information of object positions. Specifically, the indoor scene layout is represented as a multi-level structure containing nodes from three layers. As shown in FIG. 4, the three layers are a global layer, a regional layer and an object layer while the corresponding nodes are a global node, a regional node and an object node. The overall structure of the indoor scene is represented by the global node which divides the indoor scene into four regions near the wall and an intermediate region. Objects in the scene are divided into corresponding regions according to walls close to them respectively; if not close to any of the walls, such object is divided into the intermediate region. The threshold value of the distance between the object and the wall close to it is set to be 10% of the length of the corresponding wall. If a distance is smaller than this threshold value, the object is considered to be close to the wall. There are three relations in the graph model, namely, a "global-region" relation, a "region-object" relation and an "object-object" relation. In the example shown in FIG. 4, the content of the region right and the region center are missing due to the visual angle for the image, so the corresponding "global-region" relation is represented by a dashed line.

The semantic information, layout rules and color information are embedded into the nodes and sides of the graph model according to the representation of the graph model. The three kinds of nodes include different information of semantics, layout and color, respectively. For the entire scene, the ceiling, the floor and the wall form the basic structure of the indoor scene, so the global node records the overall structure of the scene and the color of the ceiling, the floor and the wall. The regional node includes the position of each region in the scene, i.e., the area being close to the wall region or the intermediate region. Meanwhile the regional node further records the order in which the objects that are included in the region occur when the region is traversed clockwise. The object node includes the semantic category, position, area size, importance and color distribution feature of the object. The object position is determined by the center point of the object. The object importance is the product of the area size of the object and the frequency of occurrence of the semantic category of the object, where the implication is that: for a semantic category object that frequently occurs, if its area size is larger, then its effect on the entire scene layout is more obvious. The frequency of occurrence of the semantic category object is obtained by counting based on the training data set.

The "global-region" relation and the "region-object" relation are a parent-child inclusion relation, meaning that the global situation contains the region or the region contains the object. The "object-object" relation is a sibling relation which means a pairing relation between two objects. There exists "object-object" side connection between objects in a pairing relation. The distance between objects is recorded by the object-object side since the pairing relation and the distance between the objects are highly relevant.

Calculate the similarity between the images in the data set and the reference image, and the similarity between the images in the data set and the input 3D scene, respectively, thus arrange these images in descending order of the similarity with the 3D scene and in ascending order of the similarity with the reference image. According to the needs and preferences of users, select several images to form an image sequence, where each image is called a guiding image. Thus the layout style of the first guiding image in the image sequence is closer to the layout style of the input 3D scene than the other guiding images, and the layout style of the last guiding image in the sequence is closer to the layout style of the reference image. The core of the image sequence forming is the layout similarity measurement, and the similarity between any two scenes can be measured according to the graph model structure of the indoor scene layout and calculated quantitatively, which will be illustrated in detail.

The Similarity of the Nodes in the Graph Model.

Given graph model representations a and b for two scenes, the similarity measurement for the regional node $R^a$ in a and the regional node $R^b$ in b are performed with calculation according to the following formula.

$$S(R^a, R^b) = \lambda_1 \text{overlap}(R^a, R^b) + \lambda_2 \text{order}(R^a, R^b),$$

$$\text{overlap}(R^a, R^b) = \frac{\sum_{i \in \Phi(R^a, R^b)} imp(obj_i)}{\sum_{i \in R^a, j \in R^b} imp(obj_i) + imp(obj_j)},$$

$$\text{order}(R^a, R^b) = \frac{|\Phi(R^a, R^b)|}{\max(|R^a|, |R^b|)}$$

$R^a$ and $R^b$ includes all the objects in the corresponding region, respectively, and |•| represents the number of objects in the region. The similarity of the two region layouts includes the degree of overlap overlap(•) of the objects of the same category in both regions and the similarity order(•) between the orders of their occurrences. The more objects are overlapped in the two regions and the more similar the orders of the objects are, the more similar the layouts of the two regions will be. imp represents the importance of the object, the more the objects that are more important are overlapped, the more similar the layouts of the regions will be. The occurrence order of the objects in the region is recorded in the regional nodes and the longest common subset of the object sets in the two regions is denoted by $\Phi(R^a, R^b)$. The ratio of $\Phi(R^a, R^b)$ to the larger one of $R^a$ and $R^b$ is taken as the similarity order(•) of the order. $\lambda_1$ and $\lambda_2$ are used to adjust the weights of the degree of overlap and the similarity between the orders.

For an object node $obj_i$ in a and an object node $obj_j$ in b, the similarity measurement for the two object nodes is performed with calculation according to the following formula. Where, ∩ and ∪ respectively represent the intersection and union of the areas of the two objects. δ(obj$_i$,obj$_j$) is an indicator function: if an object i and an object j are in the same semantic category, then δ is 1, otherwise δ is 0.

$$S(obj_i, obj_j) = \frac{\text{Area}(obj_i \cap obj_j)}{\text{Area}(obj_i \cap obj_j)} * \delta(obj_i, obj_j)$$

The Similarity of the Sides in the Graph Model.

The similarity measurement for two scene layouts should also take the weights of sides in the graph model structure into consideration. For the "object-object" side connecting the objects having a pairing relation, side weight assignment is performed according to the indicator function δ(node$_i$, node$_j$). If there exists a parent-child relation or a pairing relation between the nodei and nodej, then δ(node$_i$,node$_j$) is 1, otherwise δ(node$_i$,node$_j$) is 0.

The Similarity of the Graph Models.

Using the work of Fisher et al. for reference, the way of walking path measurement is used to calculate the similarity between the layouts of two scenes. A walking path with the length of p is a set of ordered nodes connected by p−1 sides on the graph model. The similarity between the walking paths of the same length on graph model representations a and b is the summation of the similarity measurement values of the nodes on the paths and the similarity measurement values of edges on the paths. Specifically, the similarity between the first node on the walking path of a and the first node on the walking path of b is calculated, and the similarity between the first edge on the walking path of a and the first edge on the walking path of b is calculated, by that analogy, until all the paths are traversed, the current walking path similarity of a and b is obtained by accumulating the similarities of all nodes and sides. The similarity $k_p(G^a, G^b)$ between the graph models of two scenes is defined as the summation of the similarities of the walking paths in all lengths. Because the regional nodes and the object nodes are not comparable, the uncomparable node pairs are skipped.

The Selection of the Image Sequence.

According to the users' needs or preferences, N images are selected from the image data set to form an image sequence. The N images include the first $n_s$ images whose layouts are similar to the input 3D scene layout, the first $n_r$ images whose layouts are similar to the reference image scene layout, and the first $n_l$ images whose layouts are similar to both the input 3D scene layout and the reference image scene layout. The image sequence are formed by arranging in the order of $n_s$, $n_l$, $n_r$.

Given an input 3D scene and a reference image, the similarity measurement between the images in the image data set and the reference image and the similarity measurement between the images in the image data set and the input 3D scene are respectively performed and sorted, then $n_s$ images and $n_r$ images are selected. When the $n_l$ images in the middle are being selected, based on the known similarity between each image and the input 3D scene as well as the similarity between each image and the reference image, the difference between the two similarities is then calculated. Select the first $n_l$ images with the difference less than a threshold value (in an experiment, the threshold value is 5% of the maximum difference of similarity) and arrange them in descending order.

After selecting the gradient image sequence, taking each image as a reference image, the layout and color style of the reference image are transferred to the indoor 3D scene. The present invention performs the layout style transfer on the 3D scene according to the layout constraint of the reference image and the learned layout rules. According to the professional knowledge of the interior designer, the present invention artificially specifies the position and the distance of a salient object in the input image as a priori layout constraint. Since each object in the scene is possible to be arranged in various layouts, the solutions for the layout are diversified. In order to find the optimal layout solution, the present invention adopts a stochastic optimization method based on Markov chain and Monte Carlo sampling operator to establish a layout probability model, and minimizes an energy function according to a Metropolis-Hastings rule. The energy function is defined as follows, where S is the current layout state, which is the set of position coordinates of each object in the 3D scene, while $x_i$ and $y_i$ are the coordinates of the object i, and t is the number of objects in the scene. The present invention only considers the coordinates in the horizontal plane while the vertical position relation in the space is not taken into consideration, therefore the default coordinate on the z axis is 0, that is, all the objects are placed on the ground.

$$P(S) = \exp(-\beta E(S)), S = \{(x_i, y_i) | i = 1K\ t\}$$

P(S) is a probability value of the current state, and E(S) is an energy of the current state. According to the Metropolis-Hastings rule, in each iteration, a new state will be generated from the current state according to the probability. As to such possible change of state, whether to accept it or to refuse it is determined depending on the probability and the probability for acceptation is α(S→S*). Each time a new state is accepted, the new state is saved in the solution set until the iteration terminates, and the optimal solution in the solution set serves as the final layout solution.

$$\alpha(S \to S^*) = \min\left(1, \frac{P(S^*)}{P(S)}\right)$$

E(S) is defined to be composed of energy terms corresponding to the four layout rules in the present invention, $$E(S) = \lambda_1 \sum_i E_{pl}(i) + \lambda_2 \sum_{i,j} E_{pr}(i,j) + \lambda_3 \sum_i E_{or}(i) + \lambda_4 \sum_{i,j,k} E_{acc}(i,j)$$

$$E_{pl}(i) = \sum_i \max(0, T_{mean} - \text{mean}(i))$$

$$E_{pr}(i,j) = \sum_{i,j} \|dis(i,j) - T_{dis}(i,j)\|$$

$$E_{or}(i) = \sum_i \|dis_{wall}(i) - T_{wall}(i)\|$$

$$E_{acc}(i,j) = \sum_i \sum_j^t \sum_k \max\left(0, 1 - \frac{\|O_i - Oa_{jk}\|}{d_i + da_{jk}}\right)$$

$E_{pl}$ is the energy term of the position relation, and $E_{pr}$ is the energy term of the semantic category pair relation, $E_{or}$ is the energy term of the orientation relation, and $E_{acc}$ is the energy term of the accessible relation. In $E_{pl}$, $$\text{mean}(i) = \frac{1}{k} \sum_1^k f(\text{patch}),$$

patch∈i, which is the probability of the position at which the object i is located in the current state S, and k is the number of blocks occupied by the object i. $T_{mean}$ is the positional priori value of the semantic category to which object i belongs, which is counted and learned from the top view of layout marking map of the training set. In $E_{pl}$, $T_{dis}(i,j)$ is the distance priori value of the semantic category pairs to which object i and object j belong, and dis(i,j) is the Euclidean distance of i and j in the current state, which is calculated according to the coordinates of their center points. In $E_{or}$, $dis_{wall}(i)$ is the vertical straight line distance from the center point of i to its nearest wall, and $T_{wall}(i)$ is the orientation mean value of the semantic category to which i belongs. As a penalty term, $E_{acc}$ is used to punish the case that the distance between object i and the object j is too short, where k=4, which is the number of center points in the accessible space. In the current state, an object is selected randomly and the layout of the object is changed to create a new state. Randomly changing the layout of the object includes two cases, i.e., the translation of the object coordinates and exchanging the positions of two objects. The translation of coordinates is calculated according to the following formula. The plus-minus sign is randomly selected, an incremental parameter $\Delta$ obeys the normal distribution, and a pace adjustment parameter $\delta$ is determined depending on the energy value of the current state, serving for speeding up the convergence of iteration, and $\beta_1$ and $\beta_2$ are the threshold values.

$$(x_i, y_i) \rightarrow (x_i \pm \delta\Delta x, y_i \pm \delta\Delta y), \Delta x, \Delta y \sim N(0, \sigma^2)$$

$$\delta = \begin{cases} \delta, & E(S) > \beta_1 \\ 0.5\delta, & \beta_2 \leq E(S) \leq \beta_1 \\ 0.25\delta, & E(S) < \beta_2 \end{cases}$$

In the 3D scene after the layout style transfer is performed, the color style transfer is performed on the 3D scene according to the color style of the input image. For the reference image, the color style thereof is extracted as a constraint; $m_1$ is the number of objects in the input image img, and $m_2$ is the number of objects in the 3D scene 3D. The recoloring for the 3D scene is to select an appropriate color for each object in the scene by using an optimization algorithm, so that the 3D color style not only meets the color constraint of the input image but also preserves its original local color relation and meets the learned color rule. The present invention defines an energy function as shown in the following formula, where $E_1$ is an energy term of the semantically corresponding relation in the image and 3D scene, to make the color of the objects in the 3D scene similar to the color of the corresponding objects in the image to the greatest extent. i is a common object in the input image and the 3D scene, and $h_i$ is a hue mean value of the object in the 3D scene, and $C_i$ is a hue mean value of the corresponding object in the input image. $E_2$ is an energy term used to maintain the coordination for the hue distribution of the entire 3D scene, that is, to maintain the local linear relation of the hue between the object i and its neighbor j, while $w_{ij}$ is the weight of the neighbor j in the local linear relation. $E_3$ is a least squares energy term used to adjust the hue of each object in the 3D scene so that the hue circle section of the 3D scene color distribution conforms to the sectional region of the color style template, while s is the number of sides of the sectional region. As to the color style template, the present invention firstly rotates it so that its sectional region can overlap the sectional region for the hue of the 3D scene to the greatest extent. Then, a corresponding relation of a side $H_i^{edge}$ of the sectional region of the 3D scene and a side of the sectional region of the template is established, and then the side $h_i^I$ of the 3D scene sectional region is adjusted to rotate to the position of the side of the sectional region of the template. When there is an object with no corresponding relation established, that is, when a certain object category in the 3D scene does not exist in the input image, since the object of this category does not have a reference color, the hue of such object is adjusted according to $E_4$. For example, for the object i with no reference color in the 3D scene, the objects $j_1$, $j_2K$ $j_k$ with reference color in the 3D scene are selected according to the layout-color rules and the position of the object i, and there are high frequencies for the object i and j in the layout-color rules. For each combination $(i,j_k)$, the hue difference value $\Delta h(i,j_k)$ is determined based on the distance difference of this set of objects in the 3D scene, whereby the reference color $H_1$ of the object i under this combination is determined to be $(h(j_k)+\Delta h(i,j_k))\%360°$.

$$E = \alpha_1 E_1 + \alpha_2 E_2 + \alpha_3 E_3 + \alpha_4 E_4$$

$$E_1 = \sum_{i \in img \cap 3D} (h_i - C_i)^2$$

$$E_2 = \sum_{i=1}^{n} \left( h_i - \sum_{j \in N_i} w_{ij} h_j \right)^2$$

$$E_3 = \sum_{i=1}^{s} \left( h_i^l - H_t^{edge} \right)^2$$

$$E_4 = \sum_{i \in 3D-img} (h_i - H_i)^2$$

$\alpha_1$, $\alpha_2$, $\alpha_3$ and $\alpha_4$ are adjustment coefficients of respective energy terms, which are 0.5, 0.8, 4.5 and 0.7 respectively in the present invention. After forming the energy function of color style, the color value of each object is calculated and obtained using a conjugate gradient algorithm. Thus, an indoor 3D scene with style features of the input image is obtained.

The difference between every two adjacent images in the image sequence is relatively small, therefore, in order to perform the style transfer faster, the style difference between every two adjacent images is calculated firstly. When the style transfer for the first image is completed, the style transfer for the rest of the images can be completed gradually with difference transfer only. The method is described as follows: the style of the image i in the image sequence is $S_i$, and the 3D scene after the style transfer according to the image i is $M_i$. After the style transfer for the ith image is done, the style difference between the (i+1)th image and the ith image is calculated, and the difference is transferred to the 3D scene $M_i$ to generate a new 3D scene $M_{i+1}$. The formula is as follows:

$$M_{i+1} = M_i(S_{i+1} - S_i)$$

After this iteration, a 3D scene sequence with gradient styles is generated.

The foregoing descriptions are merely some basic illustrations of the present invention, and any equivalent transformation in accordance with the technical solutions of the present invention is intended to be within the protection scope of the present invention.

What is claimed is:

1. A data driven method for transferring an indoor scene layout and color style, comprising:

step 1, preprocessing an image in an indoor image data set, which comprises: manually labeling semantic information to obtain a semantic marking map for each image, and manually labeling layout information to obtain a top view of a layout map for each image;

step 2, obtaining an indoor layout rule and a color rule on the indoor image data set by a learning algorithm;

step 3, performing an object-level semantic segmentation on an input indoor reference image, or performing an object-level segmentation and a component-level segmentation using a color segmentation method, to extract a layout constraint and a color constraint of the reference image, and associating the reference image with an indoor three-dimensional (3D) scene via the semantic information;

step 4, constructing a graph model for an indoor reference image scene and the indoor 3D scene, and using the graph model to express a layout and color of an indoor scene;

step 5, performing, according to the graph model, similarity measurement on the indoor scene, and searching for a similar image in the data set to obtain an image sequence with a gradient layout from the reference image to the input 3D scene; and step 6, performing, according to the layout rule and the color rule and combined with the layout constraint and the color constraint for each image in the gradient sequence, image-sequence-guided layout and color transfer generation for the indoor 3D scene to obtain an indoor 3D scene sequence with a layout and color style similar to that in the gradient image sequence.

2. The method according to claim 1, wherein the color segmentation method in step 3 comprises that if different components of an object in an image have different color, the component-level segmentation is performed on the image by differentiating the different components using a color classification method.

3. The method according to claim 1, wherein the graph model in step 4 is a tree structure graph which represents the indoor scene as a multi-layer structure containing nodes from three layers, wherein an entire scene is a global root node; an indoor area is divided into five regions which are region front, region back, region left, region right, region center, all serving as regional sub-nodes; an object contained in each region is an object leaf node of said region; wherein the graph model represents indoor scene layout distribution and an object pairing relation.

4. The method according to claim 1, wherein performing similarity measurement on the indoor scene in step 5 comprises: comparing graph models of two indoor scenes, calculating similarity between different regions of the indoor scenes by calculating node similarity and side similarity of the graph models, and finally calculating overall similarity between the two indoor scenes.

5. The method according to claim 1, wherein the image-sequence-guided layout and color transfer generation in step 6 is a method for gradient style transfer which is described specifically as: a style of image i in the image sequence being $S_i$, a 3D scene after performing the style transfer according to image i being $M_i$; after completing the style transfer of an ith image, calculating a style difference between an (i+1)th image and the ith image, transferring the style difference to the 3D scene $M_i$ to generate a new 3D scene $M_{i+1}$, a formula being as follows:

$$M_{i+1}=M_i(S_{i+1}-S_i);$$

wherein after such iteration, image-sequence-guided indoor 3D scene transfer generation is completed.

* * * * *